Figure 1:
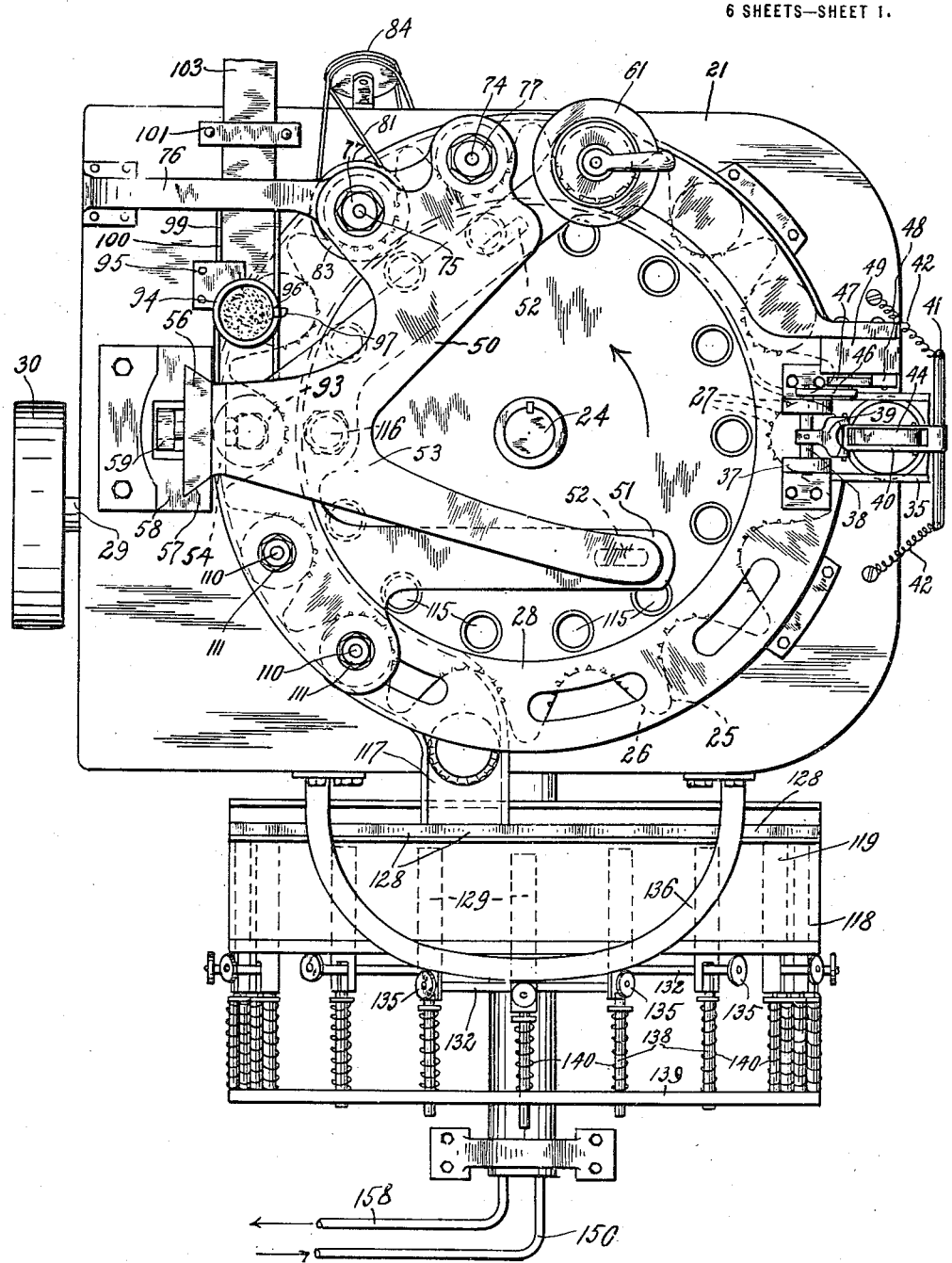

A. BOGDÁNFFY & J. ALBERTI.
MACHINE FOR THE MANUFACTURE OF BOTTLE CLOSURES.
APPLICATION FILED OCT. 16, 1913. RENEWED APR. 6, 1917.

1,245,180.

Patented Nov. 6, 1917.
6 SHEETS—SHEET 1.

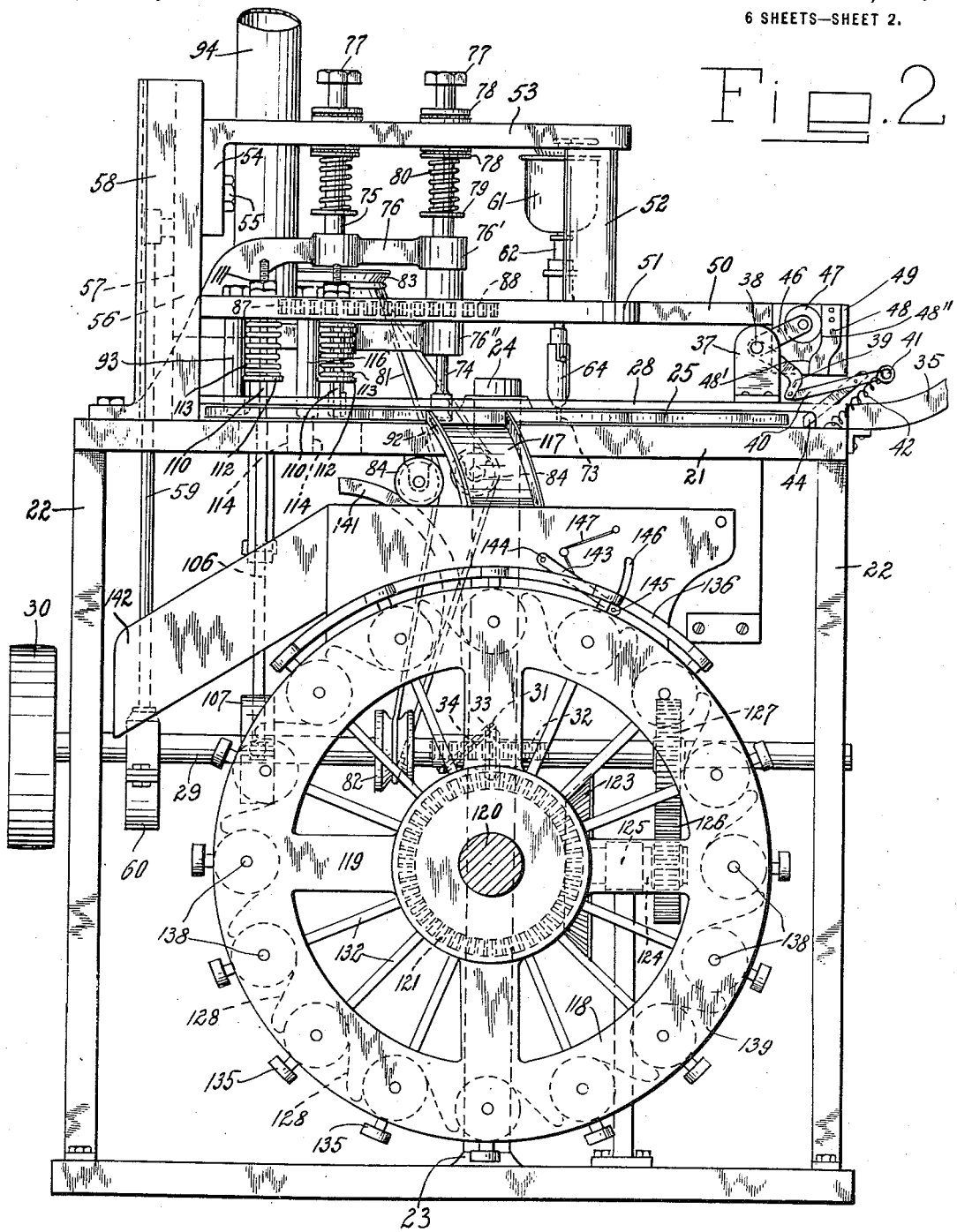

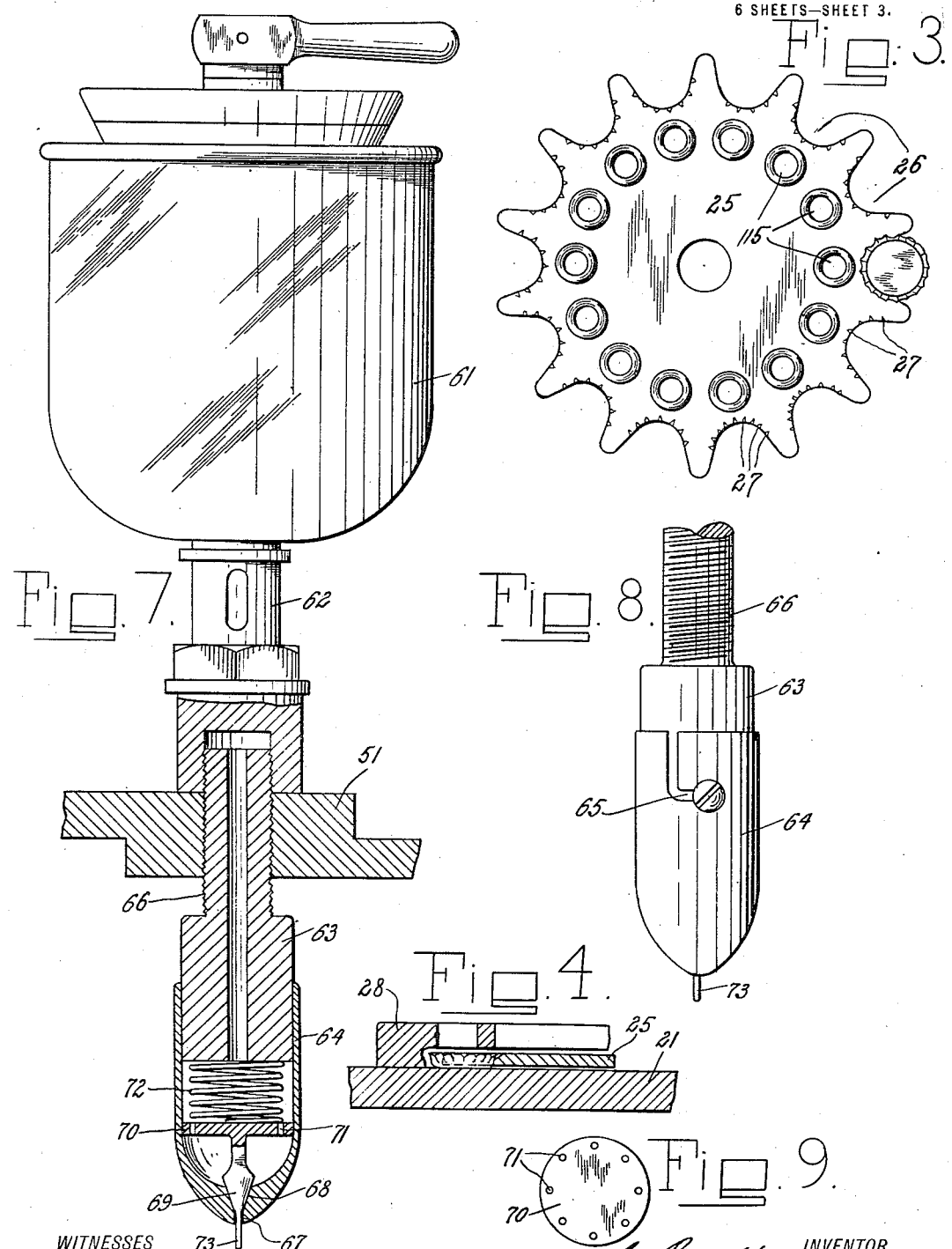

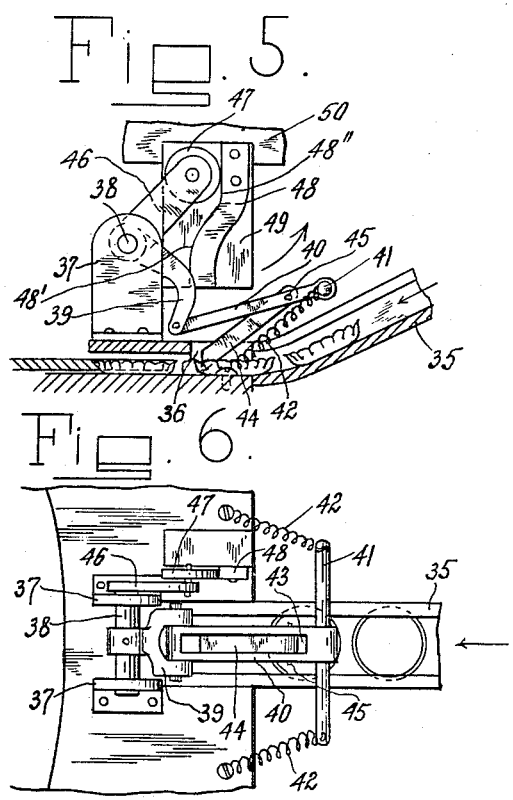

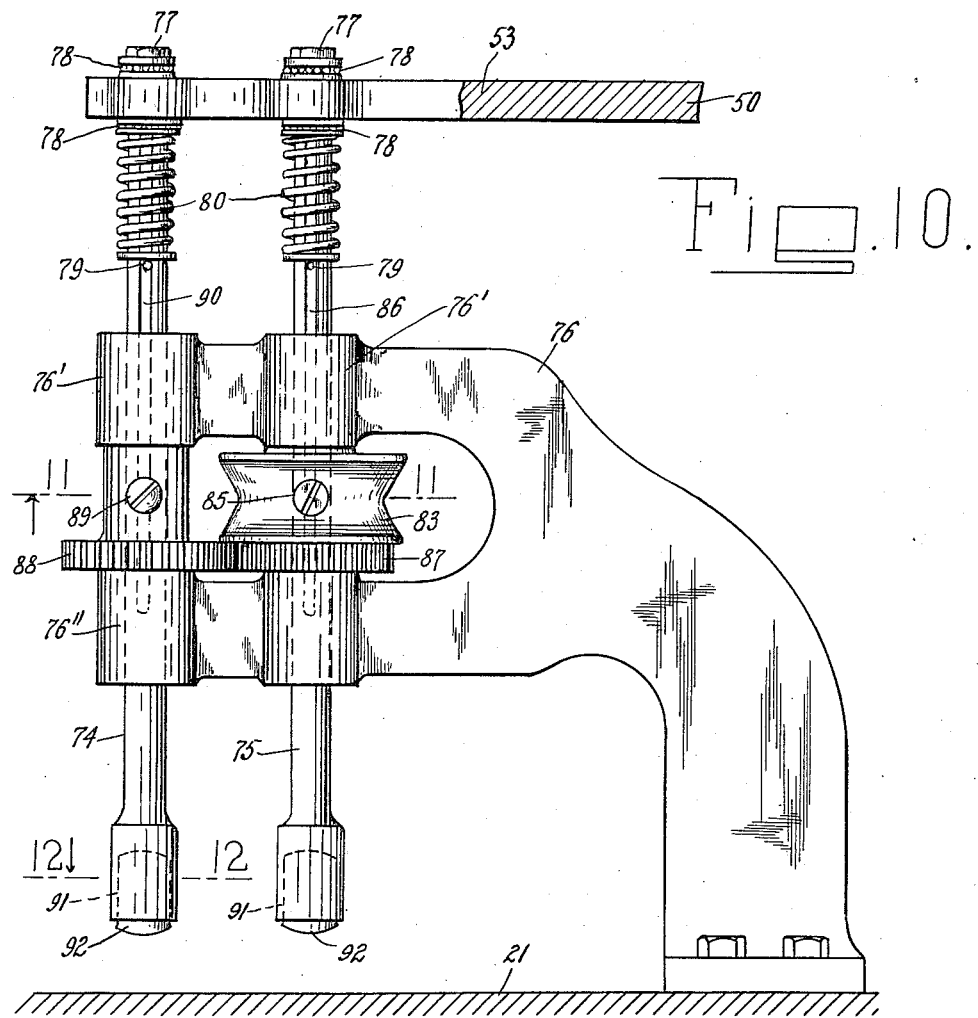

UNITED STATES PATENT OFFICE.

ALEXANDER BOGDANFFY AND JOHN ALBERTI, OF NEW YORK, N. Y., ASSIGNORS TO THE INTERNATIONAL CORK COMPANY, OF BROOKLYN, NEW YORK, A CORPORATION OF NEW YORK.

MACHINE FOR THE MANUFACTURE OF BOTTLE-CLOSURES.

1,245,180.     Specification of Letters Patent.     Patented Nov. 6, 1917.

Application filed October 16, 1913, Serial No. 795,481. Renewed April 6, 1917. Serial No. 160,312.

*To all whom it may concern:*

Be it known that we, ALEXANDER BOGDÁNFFY and JOHN ALBERTI, a subject of the King of Hungary and a citizen of the United States, respectively, and residents of the city of New York, in the county of Kings and State of New York, have invented certain new and useful Improvements in Machines for the Manufacture of Bottle-Closures, of which the following is a specification.

The present invention relates to a machine for the manufacture of closures or stoppers for bottles or like receptacles; more particularly it relates to a machine for making closures of the cap variety, including those termed "crown corks".

Closures of this type comprise usually three parts, that is a metallic cap or crown to be locked to the exterior of the neck of the bottle, etc., a sealing disk or packing of cork or the like, and a fusible impervious cementing medium, for instance in the form of a disk, interposed between the metallic cap and the sealing disk.

In manufacturing these closures, the cementing medium is fused and the assembled closure subjected to pressure before the cementing medium sets or hardens, whereby it unites the sealing disk with the metallic cap. Usually the three parts mentioned are first assembled, and the closure, as a whole, then subjected to heating action to fuse the cementing medium, pressure being applied afterward. In other cases the caps contain only the cementing medium when heat is applied to the same, the sealing disks being inserted subsequently. Generally the cementing medium is composed of copal gum, resin and a waxy substance, or of copal gum and some other suitable material or materials. To properly fuse such cementing medium, the outer surface of the metallic cap is subjected to heating action of at least 300° Fahrenheit, the heat being conducted by the cap to the cementing medium. It has been found that the extent of exposure to heat to properly fuse the cementing medium is always ruinous to decorated caps inasmuch as it affects the paint used in decorating the same and otherwise defaces the caps. Even plain caps cannot well be heated to such extent inasmuch as they are transported from one place to the other on the assembling and uniting machine at a speed which sometimes prevents the proper extent of exposure to heat which is required to fuse both faces of the cementing medium, the latter being usually in the form of a paper disk which has been soaked in or carried through a molten mixture of the substan above mentioned.

In practice it has been found that if a closure of this type is exposed to moist heat, as for instance in pasteurizing bottled beer, etc., the union between the sealing disk and the metallic cap is affected to a great degree, and in some cases, in fact, destroyed. If too much of the fusible cementing medium is contained in a closure and the liquid contents of the bottle subjected to heat, the cementing medium exudes toward the working face of the sealing disk and drips into the liquid contents of the bottle, forming "beads" therein. In manufacturing these caps, when the assembled closures are subjected to heating action, the sealing disks, if they are of cork, lose to some degree their toughness by reason of the high temperature to which they are subjected, or they may be rendered entirely useless if they are of the artificial or composite type, inasmuch as the latter contain often binding materials which are affected by heat.

The main object of the present invention is to provide a machine for carrying out a method or process for the manufacture of bottle closures, in which a firm union between the metallic cap and the sealing disk or packing is obtained by the aid of a liquid or viscous cementing medium which is coagulated and rendered insoluble by subjecting the closure to heat maintained substantially below the boiling point of water, that is to say at a point which is considerably below the heat necessary in all methods heretofore in use. All defects of the processes hereinabove mentioned are thus obviated.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

Broadly speaking, the invention, forming the subject matter of the present application for Letters Patent, comprises a mechanism for charging the metallic caps of the closures with a cementing medium, either liquid or viscous, coagulable by heat and possessing further chemical properties hereinafter fully described; suitable means being provided for inserting the sealing disks of cork or the like into the caps on top of the cementing medium; and a mechanism being provided for subjecting the assembled closures to pressure and heat, which will cause the cementing medium to coagulate and unite the metallic caps with the sealing disks. The cementing medium is either of a type which is coagulated and rendered insoluble by heat alone, or by heat and suitable chemical agents mixed therewith. Certain proteids or substances made up partly of proteids, such as albumen or blood, may be used for the purpose at hand, the same being coagulated and rendered insoluble by heat. Albumen has been found to be particularly adapted for carrying out the objects of the present invention as it is inodorous, tasteless, soluble in water and coagulates at about 140° Fahrenheit. The assembled closures can be subjected to pressure without changing the chemical properties of the albumen, and when they are, after pressure is applied and while it is maintained, subjected to heat, the albumen is easily coagulated, rendered insoluble, and forms an effective cementing medium for uniting the parts of the closures. Substances of the second type mentioned are, for instance gelatin and glycerin, which, when mixed with an aqueous solution of formaldehyde and heated, coagulate and are rendered insoluble.

One of the many possible embodiments of the invention is illustrated in the accompanying drawings, in which:—

Figure 17:
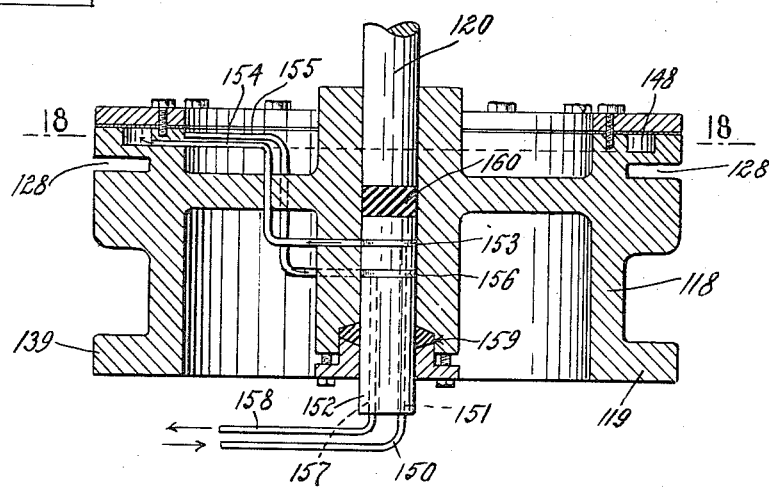
Figure 18:
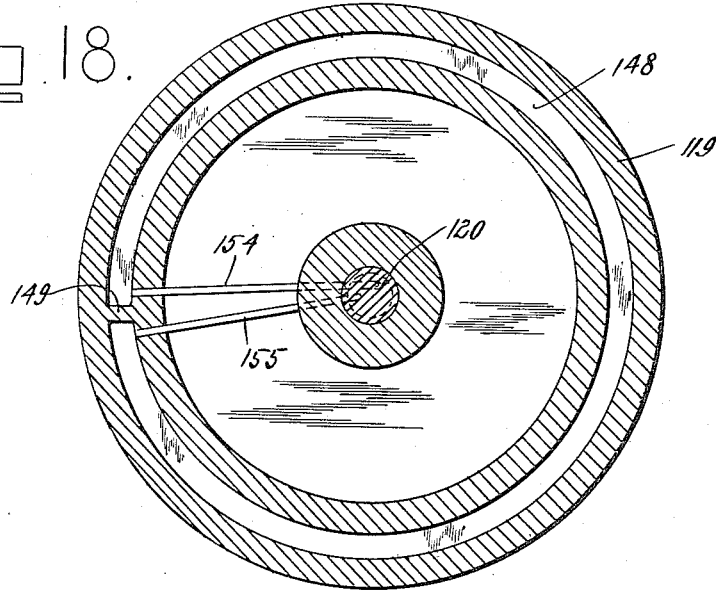

Figure 1 is a plan view of a machine constructed in accordance with the present invention; Fig. 2 is a front elevation thereof; Fig. 3 is a plan view of the transporting wheel of the metallic caps; Fig. 4 is a section taken through a portion of said transporting wheel and through a portion of the means for holding the caps in position thereon; Fig. 5 is a front elevation, partly in section, of the means for feeding the caps to the transporting wheel; Fig. 6 is a plan view thereof; Fig. 7 is a vertical longitudinal section, partly in elevation, of the mechanism for charging the metallic caps of the closures with the cementing medium; Fig. 8 is a front elevation of the lower portion of said charging means; Fig. 9 is a plan view of a detail of the device shown in Fig. 7; Fig. 10 is a rear elevation of a device for spreading the cementing medium in the caps over the inner surfaces of the heads thereof; Fig. 11 is a section taken on line 11—11 of Fig. 10; Fig. 12 is a section taken on line 12—12 of Fig. 10; Fig. 13 is a vertical section taken through the sealing disk holding means; Fig. 14 is a side elevation, partly in section, of the means for conveying the sealing disks toward the assembling means; Fig. 15 is a sectional view of the means for forcing the sealing disks into the metallic caps; Fig. 16 is a longitudinal, vertical section, partly in elevation, taken through a device for removing sealing disks from the transporting wheel when not deposited in caps; Fig. 17 is a horizontal section taken through the pressure applying and heating means of the apparatus, the spring pressed pressure applying plungers being removed therefrom; Fig. 18 is a section taken on line 18—18 of Fig. 17; Fig. 19 is a detail of construction of the pressure applying means of the machine; and Fig. 20 is a detail view of a worm for intermittently rotating the cap transporting means of the device.

In the drawings, the numeral 21 indicates a horizontal table, which is supported by legs or standards 22. In the table and in a step bearing 23 is journaled a vertical shaft 24, to which is keyed or otherwise attached a transporting wheel 25, that is disposed above the table and, preferably, made in the form of a star wheel, having recesses 26, to which the metallic caps are fed in any suitable manner in their inverted positions. In the edges of the recesses 26 are formed notches 27, accommodating the corrugations of the flange portions of the metallic caps, and thereby preventing the rotation of the latter in relation to the transporting wheel, for a purpose hereinafter to be specified. Guides 28, attached to the table 21, overlie partly the transporting wheel and keep the caps in position thereon. The transporting wheel is intermittently rotated in the direction of the arrow shown in Fig. 1 of the drawings from the main driving shaft 29 of the machine. This shaft is journaled in bearings, which are secured to or made integral with the standards or legs 22, and carries a pulley 30, that is geared to any suitable driving means. A worm 31, mounted upon the driving shaft 29, meshes with the teeth of a worm gear 32, the latter being keyed or otherwise attached to the shaft 24 of the transporting wheel. The worm 31 has a straight portion 33, and while this is engaging the worm gear 32 the transporting wheel is at rest. When the inclined portion 34 of the worm coacts with the teeth of the worm gear, the latter will be rotated through a given angle, whereby the star wheel moves a corresponding distance, transporting thus the metallic caps step by step to the assembling elements hereinafter described.

The caps may be passed to the recesses of the transporting wheel either manually or automatically. An automatic device is shown in Figs. 5 and 6 of the drawings. This device coacts with a charging chute 35, into which the caps are brought in their inverted positions automatically by any suitable means. The chute leads to a channel 36 in the guide 28, said channel extending in a radial direction relative to the intermittently moving transporting wheel 25, the latter being timed in such a manner that, whenever it stops, one of its recesses registers with the said channel. On each side of the channel 36 is mounted upon the guide 28 an upwardly extending standard 37, in which is journaled a rocking spindle 38, to which is attached a downwardly extending fork-shaped actuating member 39, between the prongs of which is disposed an outwardly extending arm 40, that is pivoted to said prongs, its free end carrying the transverse pin 41, to which are attached springs 42, 42, the same being also fastened to the table 21. The arm 40 is provided with a longitudinal slot 43, in which is located a downwardly extending feeding finger 44, that is pivoted at 45 to said arm. The springs 42 tend to force the feeding finger 44 toward the recesses of the transporting wheel. To the spindle 38 is furthermore keyed, or otherwise attached, a lever 46, carrying upon its free end a roller 47, which is caused by the springs 42 to bear against a cam 48, the latter being rigidly attached to a plate member 49, that is mounted upon a frame 50. This frame comprises a lower horizontally disposed section 51, which is connected by vertical legs 52 with an upper horizontally arranged section 53. With the section 53 is made integral a downwardly projecting vertical extension 54, which is fastened by screws 55, or otherwise, to a slide 56. This slide is, preferably, of dovetailed shape, and reciprocably disposed within the vertical guide 57 of a bracket 58, that is attached to the table 21. The slide 56 is pivotally connected with the rod 59 of the strap of an eccentric 60, the latter being keyed to the driving shaft 29. The relation between the driving means of the shaft 24 and the eccentric 60 is such that whenever movement is imparted to the shaft 24, that is whenever the transporting wheel is in motion, the frame 50 moves upward, and when the transporting wheel is at rest, the said frame moves downward. While the frame 50 is moving upward, or in other words during the movement of the transporting wheel, the face 48' of the cam 48 causes by the intermediary of the lever 46 the fork-shaped member 39 to swing in the direction of the arrow indicated in Fig. 5 of the drawings, thereby causing the feeding finger 44 to move outward and its free end to engage in the chute the next cap in the series. Obviously the springs 42 are thereby expanded. When the frame 50 moves downward and is about to reach its lowermost position, the roller 47 is adapted to swing into contact with the face 48'' of the cam 48, the springs 42 causing then a movement of the free end of the feeding finger 44 toward the transporting wheel, seating thus a cap in the recess registering with the chute. The operation described is obviously repeated during each up and downward travel of the frame 50.

The caps received from the chute 35 are transported step by step by the transporting wheel 25 in the direction of the arrow shown in Fig. 1 of the drawings, and are brought one after the other into registering position with the means which introduces into the same the cementing medium. This means comprises a receptacle 61, communicating through a pipe 62 with a tubular member 63, that extends into a valve casing 64, the latter being detachably fastened to the tubular member 63, for instance by a bayonet catch 65. The tubular member 63 is attached to the frame 50, its upper end being for this purpose reduced, as shown at 66, and provided with screw threads meshing with those of a hole in said frame. The upper end 66 of the tubular member projects above the section 51 of the frame, its screw threads meshing with the interior screw threads of the pipe 62. The valve casing 64 is provided with a discharge opening 67, around which is formed a conical valve seat 68 for a valve 69, which carries at its upper end a disk 70, snugly fitting the valve casing 64. This disk is provided with a plurality of apertures 71, through which the liquid cementing material is adapted to flow toward the valve 69. A spring 72, bearing against the lower end of the tubular member 63 and the upper face of the disk 70, keeps the valve 69 upon its seat and the pin 73, that is made integral with or attached to the valve 69, in its projected position, that is to say outside of the valve casing. Upon the downward movement of the frame 50, that is when the transporting wheel is at rest and a cap is held in registering position with the cementing material charging means, the pin 73 is caused to bear against the inner face of the cap, whereby the valve 69 is lifted from its seat and a desired amount of liquid cementing material, depending upon the sizes of the discharge opening 67 and the pin 73, is introduced into the cap. Upon the upward movement of the frame 50, the spring 72 obviously seats the valve.

The cementing material having been introduced into the cap, the latter is transported to means which spread the said cementing material over the entire inner surface of the head of the cap. This means comprises in the case illustrated in the drawings two vertically disposed spindles 74 and 75, which are rotatively and reciprocably mounted in a bracket 76, that is attached to the table 21. The upper ends of the spindles are rotatably and slidably mounted in the section 53 of the frame 50. Suitable means are provided which cause the spindles to reciprocate with the frame 50, for instance nuts 77 which mesh with the upper screw threaded ends of said spindles, ball bearings 78 preventing friction between the frame 50 and said spindles. The spindles 74 and 75 carry stops 79, against which bear the lower ends of springs 80 that are coiled around said spindles, the upper ends of said springs bearing against the ball bearings which abut against the lower face of the section 53 of the frame 50. Rotation is imparted to the spindles 74 and 75 by a belt 81, which runs over a pulley 82, that is mounted upon the main driving shaft 29, and over a pulley 83, which is attached in a manner presently to be described to the spindle 75, suitable idlers 84 being provided to guide the said belt. The pulley 83 is drawn over the spindle 75 and provided with a lug 85, that projects into a groove 86 in said spindle. To the pulley 83 is attached a pinion 87, meshing with a pinion 88, that is drawn over the spindle 74, a lug 89 on the latter pinion projecting into a groove 90 in the spindle 74. The pulley 83 and the pinions 87 and 88 are disposed between the arms 76' and 76" of the bracket 76. The lower ends of the spindles 74 and 75 are somewhat enlarged, and provided with cylindrical recesses 91, in which are disposed blocks 92, for instance of rubber, the lower faces of which are of convex configuration so as to conform to the shape of the inner faces of the metallic caps of the closures. The reciprocating frame 50 carries with it the spindles 74 and 75, which continuously rotate in opposite directions. The spindles 74 and 75 operate obviously upon two caps simultaneously, more particularly upon caps which are seated in neighboring recesses of the transporting wheel, as clearly ascertainable from Fig. 1 of the drawings. When the transporting wheel stops, the frame 50, as mentioned above, moves downward, carrying with it the spindles 74 and 75, their blocks 92 being brought into contact with the inner faces of the caps before the frame 50 reaches its lowermost position. When in such contact, the rotary blocks spread the liquid cementing material over the entire inner surfaces of the heads of the caps, which are held against rotation by the means above described. The frame 50, upon its further downward movement, compresses the springs 80. When the frame 50 moves upward, it leaves the blocks 92 in contact with the inner surfaces of the caps until the upper face of the section 53 of the frame 50 contacts with the ball bearings 78 upon the said upper face and thereby carries the spindles 74 and 75 with it. The purpose of carrying the spindles 74 and 75 slidably upon the frame 50 is to permit the said spindles to remain for some time within the caps so that they are able to perform the spreading operation properly. If no sliding motion were permitted between the frame 50 and said spindles, the latter would stay for a moment only in the caps, inasmuch as the frame 50 starts its upward stroke immediately after it has finished its downward stroke. Instead of two spreaders, one may be provided, obviously.

After the cementing material has been properly spread over the surfaces of the caps, the same are transported one after the other to an assembling plunger 93, that is attached to the frame 50. The sealing disks are placed into a vertical tube 94, which is secured to the table 21 by a bracket 95 or otherwise, and is provided with a longitudinal slot 96, through which the finger-piece 97 of a weight 98 protrudes, said weight being placed on the sealing disks and serves to feed the same into a guideway 99 of a plate member 100, which is attached to the table by a bracket 101 in a plane above the upper face of the transporting wheel 25. The plate 100 is provided with an aperture 102 in alinement with the plunger 93. This aperture tapers toward the wheel 25, its upper diameter being larger than the diameter of a sealing disk, and the diameter at its lower end being smaller than that of a sealing disk. The purpose of this arrangement will be explained presently. The sealing disks are conveyed in the guideway 99 from below the tubular member 94 to the aperture 102 by a reciprocable conveyer 103, which is slidably arranged in the guideway 99, and pivoted to a lever 104, that is fulcrumed at 105 to the frame of the machine, and connected by a rod 106 with the strap of an eccentric 107, the latter being keyed to the main driving shaft of the machine. The conveyer 103 is provided with a recess 108, which engages the sealing disks in transferring the same to the aperture 102. Obviously the angular relation between the eccentrics 60 and 107 must be such that when the frame 50 is lifted, the conveyer 103 will move inward and thereby transfer a sealing disk within the reach of the plunger 93, which, in its downward movement, will force the sealing disk through the aperture 102 into the metallic cap. It should be noted that, since the diameter of the lower end of the aperture 102 is smaller than that of a sealing disk, the latter will be compressed to some extent and, when forced into the cap, will expand and be held thus firmly in the cap.

As it happens sometimes that one or the other of the recesses in the transporting wheel does not contain a metallic cap, it becomes necessary to eject the sealing disk from that recess after it has passed the plunger 93. For this purpose the frame 50 carries two downwardly extending tubular members 109, in which are slidably arranged spindles 110, provided upon their upper ends with stops 111 and near their lower ends with disks 112. Against these disks and the frame 50 bear springs 113, which tend to force the spindles downward toward the table 21. The spindles 110 are disposed upon the frame 50 in such a manner that they are in registering positions with two neighboring recesses in the transporting wheel when the latter is at rest. When, therefore, the frame 50 moves downward, the spindles 110 will enter two neighboring recesses of the star wheel. If assembled crown corks are in these recesses, the springs 113 will be compressed by the upward movement of the spindles 110. If, however, only a sealing disk is seated in one or the other of said two recesses, the corresponding spindle 110 will force the same through an opening 114 in the table into a receptacle below said opening, for the reason that the tension of a spring 113 is greater than the resistance offered by a sealing disk in a recess of the star wheel.

The star wheel 25 is provided with a plurality of holes 115, corresponding in number to that of the recesses therein, said holes being arranged in a circle and are adapted to be entered one after the other by a centering lug 116, that is carried by the frame 50. At each stop of the transporting wheel one of the holes 115 is brought into registering position with the centering lug, the latter entering the said hole upon the downward movement of the frame 50, thereby keeping the transporting wheel in fixed position while the assembling elements hereinbefore described are in operation.

The assembled crowns slide down an inclined passage 117 to a heating and uniting head 118. This head comprises a rotary drum 119, keyed to a shaft 120, which is continuously driven from the main driving shaft of the machine. For this purpose the shaft 120 carries a bevel gear 121, meshing with the similar gear 123, that is keyed to a shaft 124, the latter being journaled in a bearing 125. Upon the shaft 124 is furthermore mounted a spur gear 126, meshing with a similar gear 127, the latter being fixedly attached to the main driving shaft 29. The drum is provided with a plurality of peripheral recesses 128, which are adapted to receive one after the other assembled crowns from the passage 117. Plungers 129 are slidably arranged in the drum in alinement with the recesses, said plungers being located paralled to the longitudinal axis of the drum, and provided at their outer forked ends each with a pin 130, which engage slots 131 in radial arms 132, the inner ends of which are pivoted at 133 to the hub 134 of the drum, while their outer free ends carry rollers 135, which are adapted to coact with a cam 136, that is attached to the frame of the machine. The radial arms 132 are engaged by the pointed ends 137 of spring pressed pins 138, which are slidably arranged in apertures of a ring 139, which is, preferably, made integral with the drum. The cam 136 is disposed in the path of the rollers 135, whereby, as the drum rotates, the plungers 129 are forced against the action of the springs 140 upon the pins 138 out of the recesses 128 before they arrive opposite to the passage 117. When a recess arrives at this point, an assembled crown cork will slide into the same, and after the corresponding roller 135 is disengaged from the cam, the corresponding spring 140 forces the plunger against the assembled crown cork, thereby placing the parts of the closure under compression, and holding them in this condition until the closure makes very nearly a complete revolution around the shaft 120, when the roller of the plunger again arrives at the cam 136, whereby the plunger is disengaged from the closure, allowing the same to be guided by a projection 141 into a chute 142. A tongue 143 is pivoted at 144 to a stationary part of the frame, its free end being provided with a pin 145, engaging an arc-shaped slot 146 in the frame. A spring 147 forces the tongue into contact with the drum so that closures, which are not properly seated in the recesses of said drums, will be forced into the same before a plunger engages them.

While the closure is being carried by the drum and held under pressure, its cementing medium is coagulated by suitable heating means. For this purpose a suitable fluid, for instance steam, is admitted into an annular channel 148, formed in the drum 119 in rear of the recesses 128. In the channel 148 is provided a radially extending partition 149, the heating fluid being admitted into the channel on one side of said partition, travels around said channel, and leaves the same on the other side of the partition. The fluid flows to the channel 148 through a pipe 150, communicating with a bore 151 in a stationary cylindrical member 152, which is arranged within the hub 134. The bore 151 leads to a peripheral groove 153 in said cylindrical member, said groove being connected with a pipe 154, which leads to the channel 148 on one side of the partition 149. The other side of the partition is connected by a pipe 155 with a peripheral groove 156 in the cylindrical member 152. This peripheral groove communicates with a bore 157 in said cylindrical member, the latter bore being connected with a pipe 158. A stuffing box 159 and a packing material 160 prevent a leakage of the fluid in the direction of the longitudinal axis of the shaft 120. The fluid, admitted through the pipe 150 and the passages communicating therewith into the channel 148, flows through the same, and leaves it through the pipe 155 and the passages communicating therewith. The temperature of the fluid is maintained at a point sufficient to coagulate the cementing medium within the assembled closures. The coagulation results in a firm union between the parts of the closure, such union being instantaneous, particularly when albumen is used.

It is to be observed that the temperature at which the cementing medium is coagulated is considerably below the heat applied in all methods of manufacturing bottle closures heretofore in use, and for this reason the process herein described can be used in connection with plain and decorated caps, and with all sealing disks whether they be of cork or of the artificial or composite type. Inasmuch as the cementing medium is rendered insoluble, the union between the parts of the closure will not be destroyed if it is exposed to moist heat, for instance when pasteurizing bottled beer, etc. The cementing medium forms an insoluble and impermeable film between the sealing disk and the metallic cap, wherefore the contents of a bottle cannot work their way through the cementing medium, nor is the latter able to drop into said contents in the form of "beads", or otherwise. A better and more effective union is formed for the reason that the cementing medium adheres to the metallic caps irrespective of the fact whether the said caps are spotted with greasy or oily matter or not. The cementing media heretofore in use were defective in this respect inasmuch as they did not adhere to greasy or oily metallic surfaces.

If necessary, a paper or other disk may be interposed between the metallic cap and the sealing disk. In such cases the cap is first charged with a suitable quantity of cementing medium, the paper disk placed on top of it, the exposed face of said disk coated with the cementing medium, after which the sealing disk is deposited into the cap, and the assembled closure subjected to the treatment above mentioned, or the paper or other disk may be coated before insertion with the cementing medium. In the appended claims it is intended to include in the term "cementing medium" the said medium alone or a disk of paper or other material coated therewith.

What we claim is:

1. In a machine for the manufacture of bottle closures of the cap variety, the combination with means for charging a cap with a cementing medium which is coagulable by heat, of means for depositing a sealing disk into the cap on top of the cementing medium, means for placing the parts of the closure under pressure, and means for coagulating the cementing medium while the pressure is maintained.

2. In a machine for the manufacture of bottle closures of the cap variety, the combination with means for charging a cap with a liquid cementing medium which is coagulable by heat, of means for depositing a sealing disk into the cap on top of the cementing medium, means for placing the parts of the closure under pressure, and means for coagulating the cementing medium while the pressure is maintained.

3. In a machine for the manufacture of bottle closures of the cap variety, the combination with means for charging a cap with a liquid cementing medium which is coagulable by heat, of means for spreading the cementing medium over the inner face of the head of the cap, means for depositing a sealing disk into the cap on top of the cementing medium, means for placing the parts of the closure under pressure, and means for coagulating the cementing medium, the pressure being maintained while said coagulation takes place.

4. In a machine for the manufacture of bottle closures of the cap variety, the combination with means for charging a cap with a liquid cementing medium which is coagulable by heat, of means for spreading the cementing medium over the inner face of the head of the cap, means for depositing a sealing disk into the cap on top of the cementing medium, means for placing the parts of the closure under pressure, and heating means for coagulating the cementing medium, the pressure being maintained while said coagulation takes place.

5. In a machine for the manufacture of bottle closures of the cap variety, the combination with a cap transporting mechanism, of a vertically reciprocable frame disposed above the same, means carried by said frame for charging a cap with a liquid cementing medium, means attached to said frame for spreading the cementing medium over the inner face of the head of the cap, means mounted upon said frame for depositing a sealing disk into the cap on top of the cementing medium, means for placing the parts of the closure under pressure, and means for heating the assembled closure, 6. In a machine for the manufacture of bottle closures of the cap variety, the combination with a cap transporting mechanism, of a vertically reciprocable frame disposed above the same, means carried by said frame for charging a cap with a liquid cementing medium which is coagulable by heat, means attached to said frame for spreading the cementing medium over the inner face of the head of the cap, means mounted upon said frame for depositing a sealing disk into the cap on top of the cementing medium, means for placing the parts of the closure under pressure, and means for coagulating the cementing medium.

7. In a machine for the manufacture of bottle closures of the cap variety. the combination with a cap transporting mechanism, of a vertically reciprocable frame disposed above the same, means carried by said frame for charging a cap with a liquid cementing medium which is coagulable by heat, means attached to said frame for spreading the cementing medium over the inner face of the head of the cap, means mounted upon said frame for depositing a sealing disk into the cap on top of the cementing medium, means for placing the parts of the closure under pressure, and heating means for coagulating the cementing medium.

8. In a machine for the manufacture of bottle closures of the cap variety, the combination with a cap transporting mechanism, of means for feeding caps to the same, a vertically reciprocable frame disposed above said transporting mechanism, means upon said frame for actuating said feeding mechanism, means carried by said frame for charging a cap with a cementing medium, means mounted upon said frame for depositing a sealing disk into the cap on top of the cementing medium, means for placing the parts of the closure under pressure, and means for heating the assembled closure.

9. In a machine for the manufacture of bottle closures of the cap variety, the combination with a cap transporting mechanism, of means for feeding caps to the same, a vertically reciprocable frame disposed above said transporting mechanism, means upon said frame for actuating said feeding mechanism, means carried by said frame for charging a cap with a liquid cementing medium, means attached to said frame for spreading the cementing medium over the inner face of the head of the cap, means mounted upon said frame for depositing a sealing disk into the cap on top of the cementing medium, means for placing the parts of the closure under pressure, and means for heating the assembled closure.

10. In a machine for the manufacture of bottle closures of the cap variety, the combination with means for charging a cap with a liquid cementing medium, of means for spreading the cementing medium over the inner face of the head of the cap, and means for depositing a sealing disk into the cap on top of the cementing medium.

Signed at New York, in the county of New York and State of New York, this 2nd day of October, A. D. 1913.

ALEXANDER BOGDÁNFFY.
JOHN ALBERTI.

Witnesses:
SIGMUND HERZOG,
S. BIRNBAUM.